US010315591B2

(12) United States Patent
Nagashima et al.

(10) Patent No.: US 10,315,591 B2
(45) Date of Patent: Jun. 11, 2019

(54) WIRE HARNESS (71) Applicants: Yazaki Corporation, Tokyo (JP); TOYOTA JIDOSHA KABUSHIKI KAISHA, Toyota-shi, Aichi-ken (JP)

(72) Inventors: Toshihiro Nagashima, Makinohara (JP); Shinichi Inao, Makinohara (JP); Hideomi Adachi, Makinohara (JP); Kenta Yanazawa, Makinohara (JP); Masahisa Sugimoto, Susono (JP); Yoshiyuki Ishihara, Toyota (JP)

(73) Assignees: YAZAKI CORPORATION, Minato-ku, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/621,003

(22) Filed: Jun. 13, 2017

(65) Prior Publication Data
US 2017/0355328 A1 Dec. 14, 2017

(30) Foreign Application Priority Data
Jun. 14, 2016 (JP) .................................. 2016-117783

(51) Int. Cl.
B60R 16/02 (2006.01)
H01B 7/00 (2006.01)
H02G 3/00 (2006.01)

(52) U.S. Cl.
CPC ...... B60R 16/0207 (2013.01); B60R 16/0215 (2013.01); H01B 7/0045 (2013.01); H02G 3/26 (2013.01)

(58) Field of Classification Search
USPC .......................................... 174/72 A, 102 D
See application file for complete search history.

(56) References Cited

U.S. PATENT DOCUMENTS 1,035,931 A * 8/1912 Nagahashi .............. F16L 11/15
138/121
3,716,733 A * 2/1973 Keith ..................... H02K 5/225
138/121
(Continued)

FOREIGN PATENT DOCUMENTS

JP 10-96486 A 4/1998
JP 2009-143326 A 7/2009
(Continued)

OTHER PUBLICATIONS

Communication dated Jul. 3, 2018, issued by the Japanese Patent Office in counterpart Japanese Application No. 2016-117783.
(Continued)

Primary Examiner — Chau N Nguyen
Assistant Examiner — Muhammed Azam
(74) Attorney, Agent, or Firm — Sughrue Mion, PLLC (57) ABSTRACT A wire harness includes an exterior member having a tube shape. The exterior member includes a flexible tube part formed in a flexible bellows tube shape and a straight tube part. The straight tube part is formed continuously with the flexible tube part so as to arrange the conductive path straight and has a non-bellows tube shape. A continuous portion between the flexible tube part and the straight tube part includes a tapered portion formed in a whole peripheral direction of the exterior member so as to reduce stress concentration in the continuous portion. An inner peripheral surface and an outer peripheral surface of the tapered portion include slopes connecting a top of a bellows projection of the flexible tube part and the straight tube part, or connecting a groove bottom of a bellows recess of the flexible tube part and the straight tube part.

5 Claims, 6 Drawing Sheets

(56) References Cited

U.S. PATENT DOCUMENTS

| | | | | |
|---|---|---|---|---|
| 4,261,671 | A * | 4/1981 | Langner | F16L 1/203 138/148 |
| 5,727,599 | A * | 3/1998 | Fisher | F16L 57/00 138/110 |
| 6,502,866 | B1 * | 1/2003 | Hujisawa | F16L 21/00 285/246 |
| 9,360,144 | B2 * | 6/2016 | Carns | F16L 25/01 |
| 9,566,919 | B2 * | 2/2017 | Kushima | H02G 3/0481 |
| 9,818,504 | B2 * | 11/2017 | Maeda | H01B 7/0045 |
| 2010/0126752 | A1 * | 5/2010 | Watanabe | H01B 7/426 174/102 D |
| 2015/0041210 | A1 * | 2/2015 | Inao | B60R 16/0215 174/72 A |
| 2015/0136482 | A1 * | 5/2015 | Adachi | B60R 16/0215 174/72 A |
| 2015/0136483 | A1 * | 5/2015 | Inao | H01B 7/2825 174/72 A |
| 2015/0136484 | A1 * | 5/2015 | Inao | B60R 16/0215 174/72 A |
| 2015/0217708 | A1 | 8/2015 | Adachi et al. | |
| 2015/0294764 | A1 * | 10/2015 | Adachi | H02G 3/0468 174/113 R |
| 2016/0009234 | A1 | 1/2016 | Adachi | |
| 2016/0031392 | A1 | 2/2016 | Oga et al. | |
| 2016/0144807 | A1 * | 5/2016 | Inao | B60R 16/0215 174/72 A |
| 2016/0163422 | A1 * | 6/2016 | Sugimoto | H01B 7/295 174/72 A |
| 2016/0164269 | A1 * | 6/2016 | Inao | B60R 16/0207 174/68.3 |

FOREIGN PATENT DOCUMENTS

| | | |
|---|---|---|
| JP | 201493800 A | 5/2014 |
| JP | 2014-192906 A | 10/2014 |
| JP | 2016-32387 A | 3/2016 |

OTHER PUBLICATIONS

Communication dated Nov. 6, 2018 issued by the Japanese Patent Office in counterpart Japanese Application No. 2016-117783.

* cited by examiner

WIRE HARNESS

BACKGROUND

The invention relates to a wire harness including a tube-shaped exterior member and one or multiple conduits which are inserted into and protected by the exterior member.

In order to electrically connect together devices mounted on a car, there is used a wire harness. The wire harness is constituted of a tube-shaped exterior member and one or multiple conductive paths to be inserted into the exterior member. For example, in the below cited patent document 1, a wire harness is wired so as to pass through the vehicle underfloor of a car. Such part of the wire harness as corresponds to the vehicle underfloor is wired straight. Such wire harness is formed in an elongated shape and thus the exterior member constituting the wire harness is also formed in an elongated shape.

The exterior member is a resin molded product and includes a flexible tube part having a bellows tube shape and a straight tube part not having such flexibility as the flexible tube part has. The flexible tube part and straight tube part are formed continuously with each other. The straight tube part is formed as a part on which the conductive path can be arranged straight and also the outer peripheral surface of which is formed in a shape without irregularities.

In the below cited patent document 1, besides the structure of the wire harness, there are also disclosed the manufacture, transportation and route wiring of the wire harness. In the transportation and route wiring of the wire harness, the flexible tube part of the exterior member is bent and the long straight tube part is arranged in the vehicle underfloor.

[Patent Document 1] JP 2014-93800 A

SUMMARY

It is an object of the invention to provide a wire harness which can prevent occurrence of cracks and breakage caused by the stress concentration.

According to an aspect of the invention, there is provided a wire harness including:

an exterior member having a tube shape; and at least one conductive path configured to be inserted into the exterior member so as to be protected by the exterior member, wherein the exterior member includes a flexible tube part formed in a flexible bellows tube shape and a straight tube part not having such flexibility as the flexible tube part has, the straight tube part is formed continuously with the flexible tube part so as to arrange the conductive path straight and has a non-bellows tube shape, a continuous portion between the flexible tube part and the straight tube part includes a tapered portion formed in a whole peripheral direction of the exterior member so as to reduce stress concentration in the continuous portion, and an inner peripheral surface and an outer peripheral surface of the tapered portion include slopes connecting a top of a bellows projection of the flexible tube part and the straight tube part, or connecting a groove bottom of a bellows recess of the flexible tube part and the straight tube part.

The slopes may continue with the flexible tube part and the straight tube part through a round.

A thickness of the tapered portion may be defined so as to substantially uniform with respect to at least one of the flexible tube part and the straight tube part.

DETAILED DESCRIPTION FOR EXEMPLIFIED EMBODIMENTS

In the patent document 1, the continuous portion of the flexible tube part and straight part of the exterior member provides a location where stress tends to concentrate. Therefore, there is raised a fear that, upon receiving vibrations during running of the vehicle, cracks and breakage can occur in the continuous portion due to stress concentration. Here, for example, in the transportation and in the route wiring in the vehicle underfloor, loads such as bending are applied to the wire harness and thus, in this case as well, there is a fear similar to the above.

The invention is made in view of the above circumstances and thus it is an object of the invention to provide a wire harness which can prevent occurrence of cracks and breakage caused by the stress concentration.

A wire harness is constituted of a tube-shaped exterior member including a flexible tube part and a straight tube part formed continuously with each other and one or multiple conductive paths to be inserted into and protected by the exterior member. The flexible tube part of the exterior member is formed in a flexible bellows tube shape. Meanwhile, the straight tube part is formed as a part which does not have such flexibility as the flexible tube part has, on which the conduit is arranged straight, and which has a non-bellows tube shape.

The continuous portion of the flexible tube part and straight tube part includes a tapered portion extending in the peripheral-direction whole portion thereof for reducing or eliminating stress concentration in the continuous portion. The inner peripheral surface and outer peripheral surface of the tapered portion are both formed so as to provide slopes between the top of the bellows projection of the flexible tube part and straight tube part, or slopes between the groove bottom of the bellows recess of the flexible tube part and straight tube part.

Figure 1A:
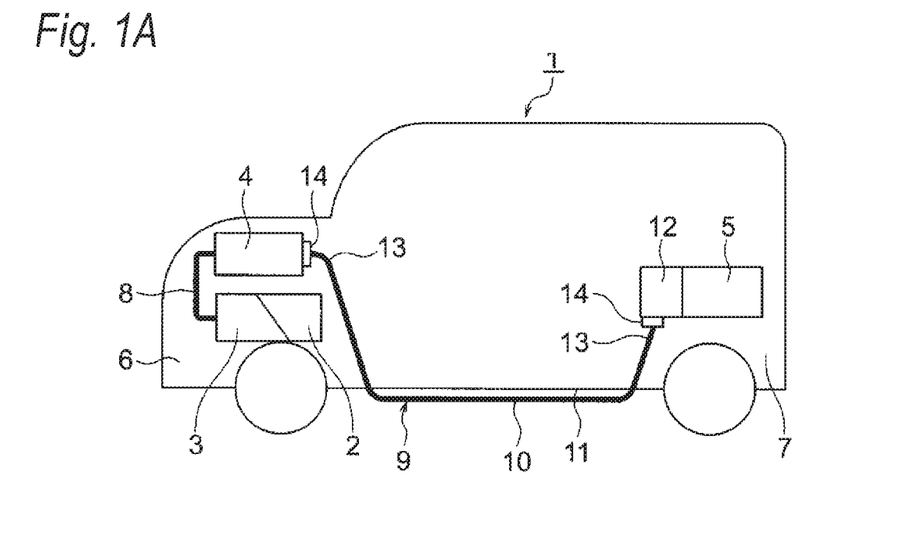
FIG. 1A is a schematic view of a high voltage wire harness according to the invention, showing the wired state thereof.
Figure 1B:
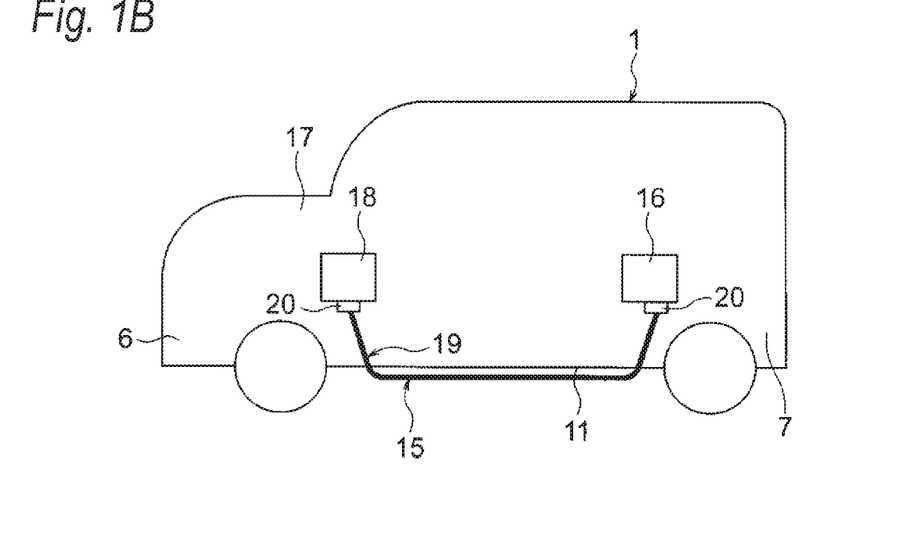
FIG. 1B is a schematic view of a low voltage wire harness according to a first embodiment of the invention, different from one shown in FIG. 1A, showing the wired state thereof.
Figure 2A:
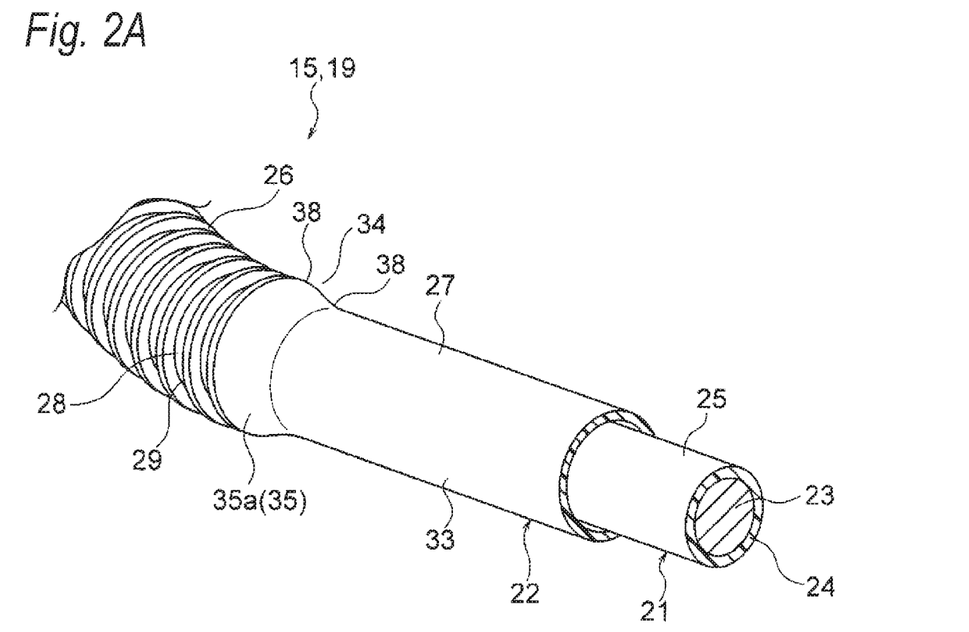
FIG. 2A is a perspective view of a tapered portion having a relatively steep slope in the wire harness according to the first embodiment.
Figure 2B:
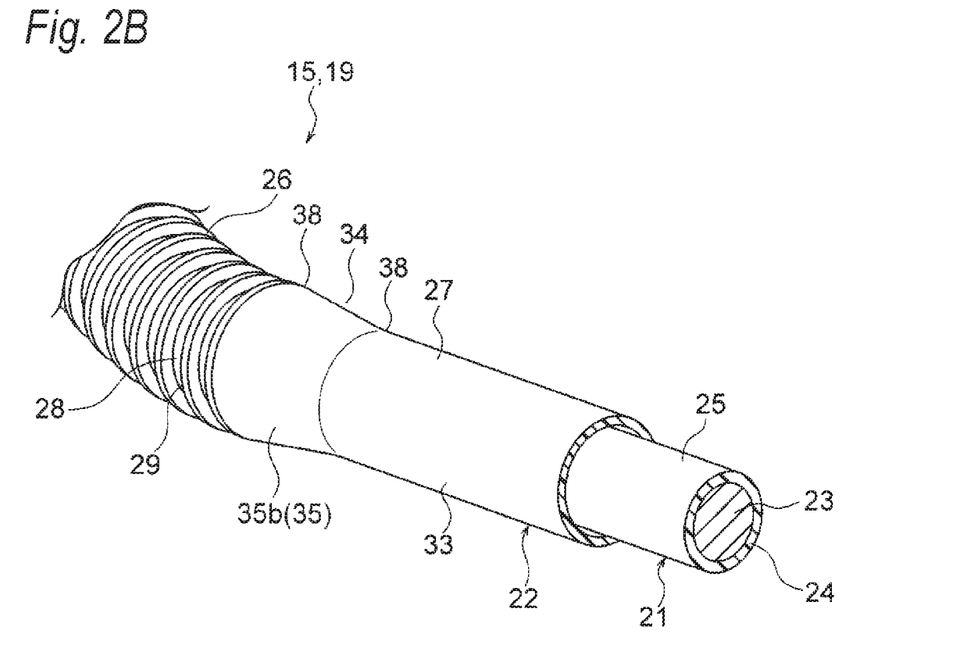
FIG. 2B is a perspective view of a tapered portion having a relatively gentle slope in the wire harness according to the first embodiment.
Figure 3A:
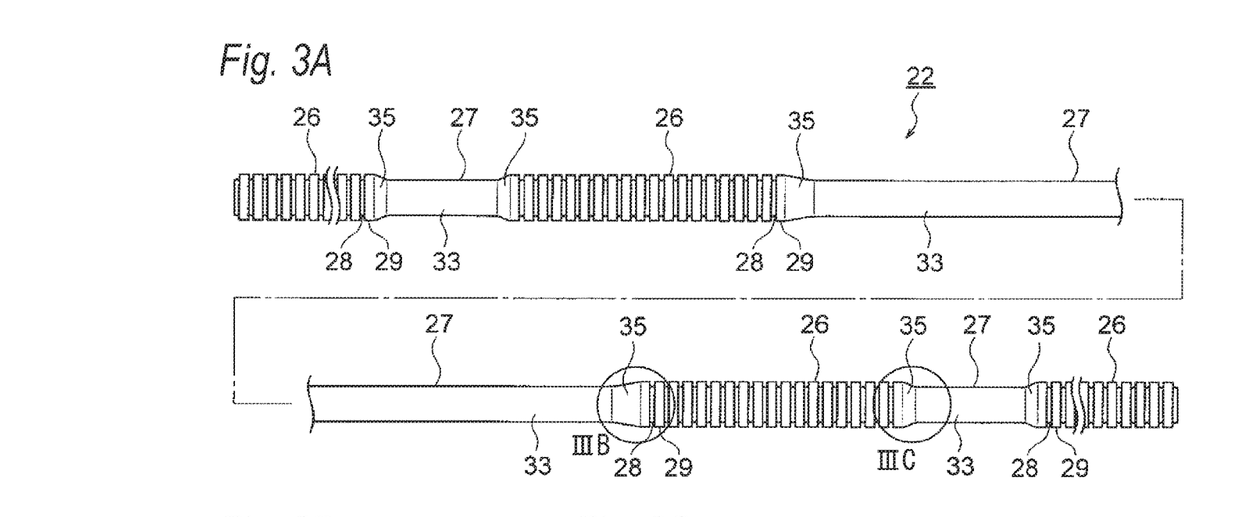
FIG. 3A is a front view of an exterior member of the first embodiment shown in FIG. 2.
Figure 3B:
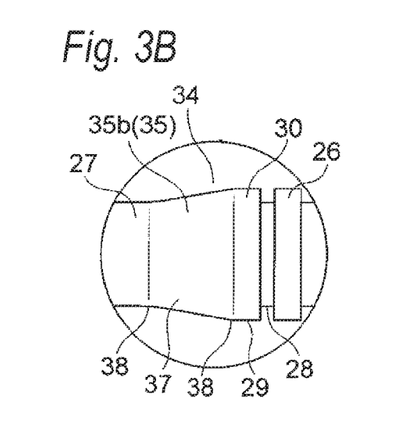
FIG. 3B is an enlarged view within a circle IIIB in FIG. 3A.
Figure 3C:
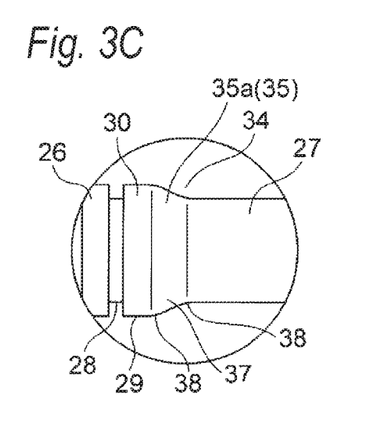
FIG. 3C is an enlarged view within a circle IIIC in FIG. 3A.
Figure 4A:
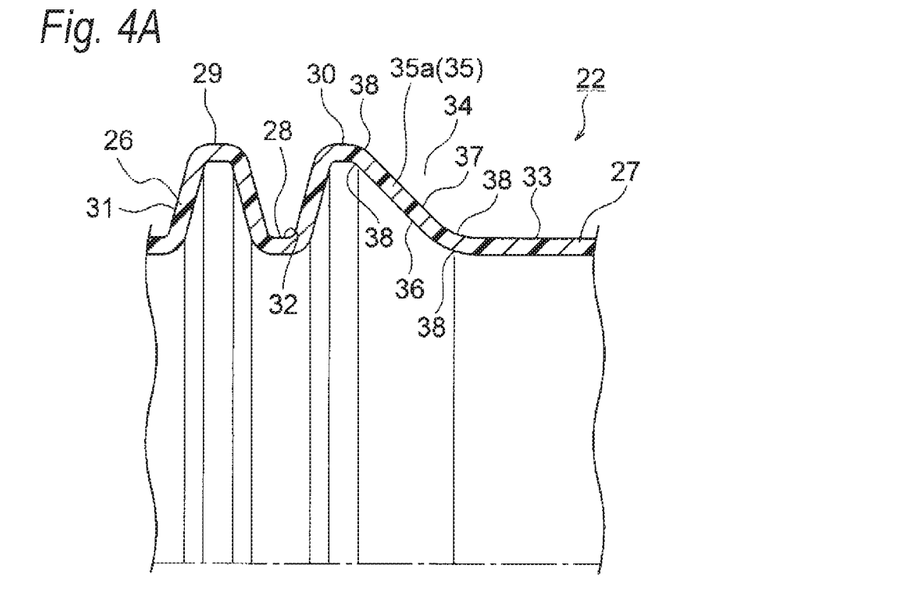
FIG. 4A is a section view of a tapered portion having a relatively steep slope of the exterior member shown in FIG. 3A.
Figure 4B:
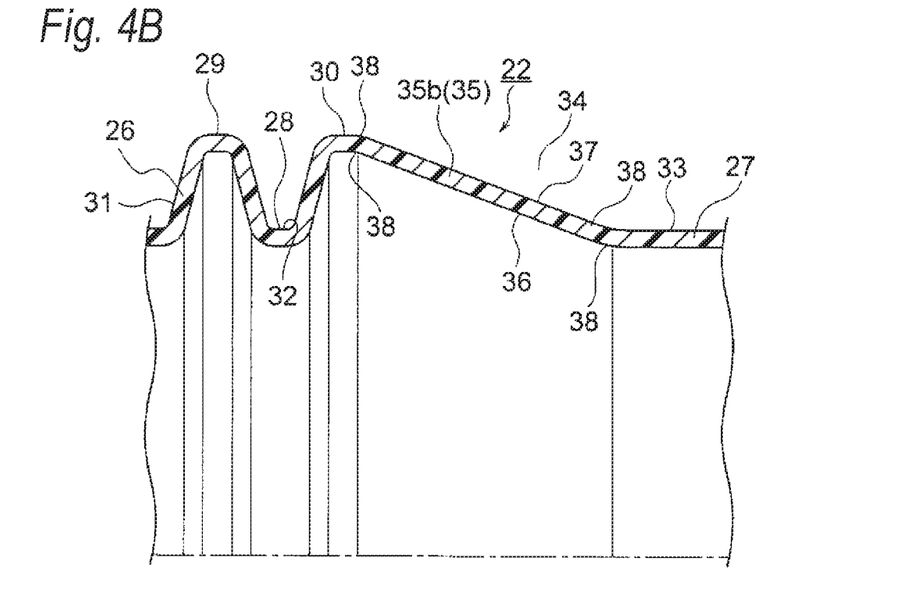
FIG. 4B is a section view of a tapered portion having a relatively gentle slope of the exterior member shown in FIG. 3A.
Figure 5:
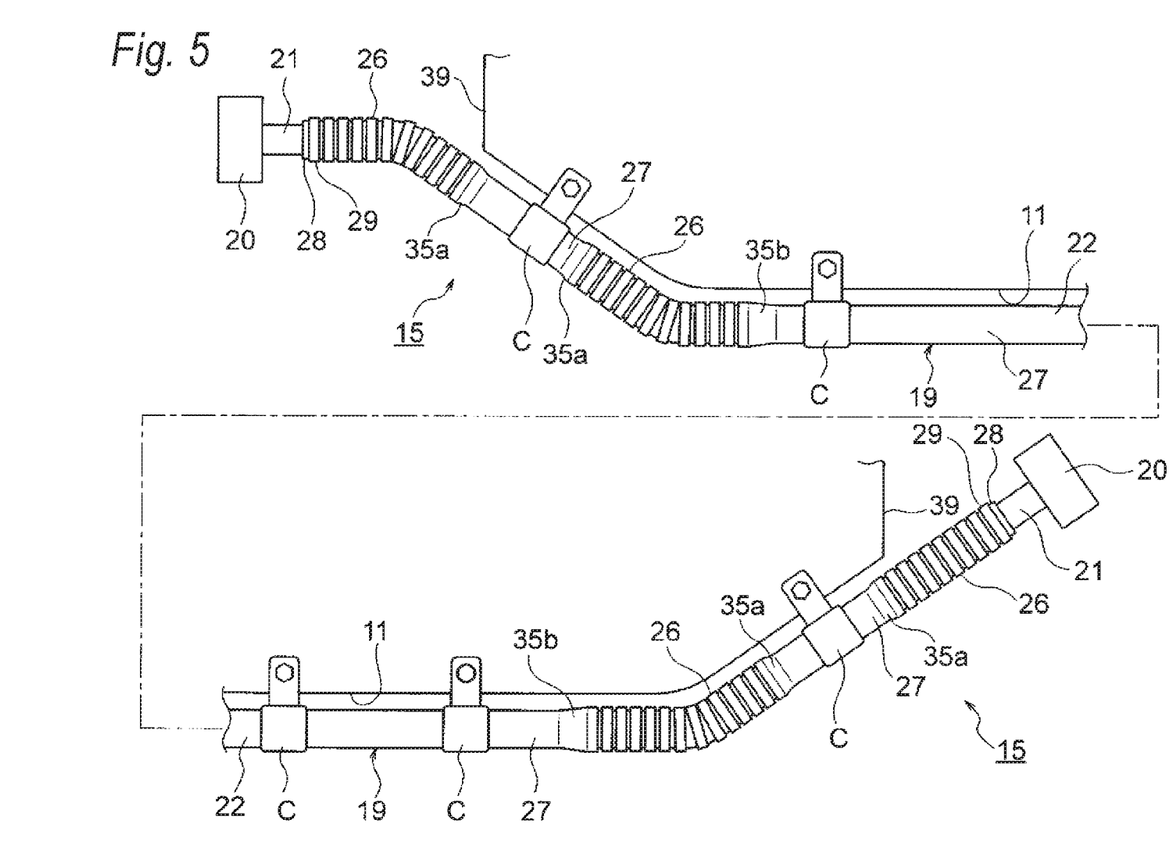
FIG. 5 shows the route wired state of the wire harness according to the first embodiment.

Description is given below of a first embodiment with reference to the drawings. FIGS. 1A and 1B show a wire harness according to the invention. Specifically, FIG. 1A is a schematic view of a high voltage wire harness, showing the wired state thereof, and FIG. 1B is a schematic view of a low voltage wire harness different from one shown in FIG. 1A, showing the wired state thereof (first embodiment). FIGS. 2A and 2B show the structure of the wire harness of the invention, FIGS. 3A to 3C are front views of the structure of an exterior member shown in FIG. 2A, FIGS. 4A and 4B are section views of the exterior member shown in FIG. 3A, and FIG. 5 shows the route wired state of the wire harness shown in FIG. 2A.

In this embodiment, the invention is applied to a wire harness to be installed in a hybrid car. The invention may be applied to an electric car, an ordinary car running on an engine, or the like.

In FIG. 1A, reference numeral 1 designates a hybrid car. The hybrid car 1 is a vehicle which is driven by mixing two motive power of an engine 2 and a motor unit 3, while electric power from a battery 5 (battery pack) is supplied through an inverter unit 4 to the motor unit 3. The engine 2, motor unit 3 and inverter unit 4, in this embodiment, are installed in an engine room 6 where front wheels and the like are disposed. Also, the battery 5 is installed in a car rear part 7 where rear wheels and the like are disposed. The battery 5 may also be installed within a car room existing rearward of the engine room 6.

The motor unit 3 and inverter unit 4 are connected to each other by a high pressure wire harness 8 (a motor cable for a high voltage). And, the battery 5 and inverter unit 4 are also connected by a high pressure wire harness 9. The intermediate part 10 of the wire harness 9 is arranged in a vehicle underfloor 11 of a vehicle (a vehicle body) and is also arranged along the vehicle underfloor 11 substantially in parallel thereto. The vehicle underfloor 11 is a well-known body (car body) and is a so called panel member having a penetration hole at a given position thereof. The wire harness 9 is watertight inserted into this penetration hole.

The wire harness 9 and battery 5 are connected together through a junction block 12 provided on the battery 5. To the junction block 12, there is electrically connected an external connecting device such as a shield connector 14 arranged on a rear end side harness terminal 13 of the wire harness 9. The wire harness 9 and inverter unit 4 are electrically connected together through an external connecting device such as a shield connecter 14 arranged on a front end side harness terminal 13.

The motor unit 3 is constituted of a motor and a generator. The inverter unit 4 is constituted of an inverter and a converter. The motor unit 3 is formed as a motor assembly including a shield case. The invert unit 4 is also formed as an inverter assembly including a shield case. The battery 5 is a Ni-MH system battery or a Li-ion system battery and is formed by modularization. Here, a power storage device such as a capacitor can also be used. The battery 5, of course, is not limited particularly so long as it can be used in the hybrid car 1 or an electric car.

In FIG. 1B, reference numeral 15 designates a wire harness. The wire harness 15 is one for a low pressure (for a low voltage) and is used to electrically connect together a low pressure battery 6 provided in the car the rear part 7 of the hybrid car 1 and an auxiliary device 18 (device) to be mounted on a car front part 17. The wire harness 15, similarly to the wire harness 9 of FIG. 1A, is arranged through the vehicle underfloor 11. This is an example and thus, for example, it may also be arranged through a car room side.

As shown in FIGS. 1A and 1B, in the hybrid car 1, there are also arranged the high pressure wire harnesses 8, 9 and low pressure wire harness 15. While the invention can be applied to any one of them, the following description is given of the low pressure wire harness 15 as a representative example. Firstly, description is given of the structure of the wire harness 15.

In FIG. 1B, the long wire harness 15 to be arranged through the vehicle underfloor 11 is constituted of a harness main body 19 and two connectors 20 respectively provided on the two ends of the harness main body 19. The wire harness 15 includes a clamp C (see FIG. 5) used to arrange the wire harness 15 at a given position and a water stop member (for example, a grommet) which is not shown.

In FIGS. 2A and 2B, the harness main body 19 is constituted of a conductive path 21 and an exterior member 22 which stores therein and protects the conductive path 21. Here, with respect to the number of conduct paths 21, in this embodiment, there is employed only one conduit but, this is an example. That is, two or three conductive paths may also be used. Also, referring to the exterior member 22, there may also be employed such exterior member that stores and protects the high pressure wire harness 9 together with the present wire harness 15.

In FIGS. 2A and 2B, the conductive path 21 is constituted of a conductive conductor 23 and an insulating insulator 24 for covering the conductor 23. The conductor 23 is formed of cooper or copper alloy, or aluminum or aluminum alloy into a shape having a circular section. The conductor 23 may have a conductor structure obtained by twisting element wires, or a rod-like conductor structure having a rectangular or circular (round) section. For example, a conductor structure has a flat single core or a round single core; in these cases, the wire itself has a rod-like shape. In the above conductor 23, on the outer surface thereof, the insulator 24 is extrusion molded from insulating resin material.

The insulator 24 is extrusion molded on the outer peripheral surface of the conductor 23 using thermoplastic resin material into a coating having a circular section. The insulator 24 has a given thickness. As the thermoplastic resin material, there can be used various kinds of well-known material. For example, polymer material such as PVC resin, polyethylene resin, or propylene resin can be selected properly. A reference numeral 25 designates the outer peripheral surface of the conductive path 21. Here, the outer peripheral surface corresponds to the outer peripheral surface of the insulator 24.

In FIGS. 2A to 3C, the exterior member 22 is formed as a single straight tube-shaped member by resin molding (before it is used, it has a straight shape). Also, the exterior member 22 is formed in a shape having no body split. In other words, a shape having no slit (a shape which is not a split tube shape). Further, the exterior member 22 is formed in a circular section shape. Although a perfect circular section shape is used in this embodiment, for example, an oval section shape, an elliptical section shape, or a rectangular section may also be used.

Such exterior member 22 includes a flexible tube part 26 and a straight tube part 27 used to arrange the conductive path 21 straight thereon. The flexible tube part 26 and straight tube part 27, as shown in FIGS. 3A to 3C, are formed in multiple numbers. Also, the flexible tube part 26 and straight tube part 27 are arranged alternately.

In FIGS. 2A to 5, the flexible tube part 26 is disposed according to a vehicle installation shape. The vehicle installation shape corresponds to a shape of a wire harness wiring destination or a shape of an installation target 39. Also, the flexible tube part 26 is formed to have a length according to the vehicle installation shape. The length of the flexible tube part 26 is not constant but is formed as necessary lengths according to the vehicle installation shape. This flexible tube part 26 is formed in a part which, in the packing and transporting operations of the wire harness 15, and further in the route wiring operation thereof to the vehicle, can be flexed at desired angles in the respective operations. That is, the flexible tube part 26 can be formed in the part that can be flexed into the bent shape and can be naturally returned to such original straight state as shown in the drawings (the state when it is molded from resin).

The flexible tube part 26 is formed in a bellows tube shape. Specifically, it includes bellows recesses 28 and bellows projections 29 respectively formed in the peripheral direction thereof, while the bellows recesses and projections 28 and 29 are formed so as to continue alternately in the tube axial direction. In FIGS. 4A and 4B, reference numeral 30 in the bellows projection 29 designates the top thereof, and reference numeral 31 designates the slope thereof. Meanwhile, reference numeral 32 in the bellows recess 28 designates the groove bottom thereof.

In FIGS. 2A to 5, the straight tube part 27 is formed as a part which does not have such flexibility as the flexible tube part 26 has. The straight tube part 27 is also formed as a part that will not bend in the wire harness packed state, in the wire harness transporting operation, and in the wire harness route wiring operation. "A part that will not bend" means a part to which is not given flexibility positively. The straight tube part 27 is formed in a long straight tube shape. The outer peripheral surface 33 of this straight tube part 27 is formed in an even shape. This is just an example; a part having such a shape as shown in a second embodiment may also be employed.

The straight tube part 27 is formed in a rigid part when compared with the flexible tube part 26. This straight tube part 27 is formed in such position and length as correspond to the vehicle installation shape. Here, the longest straight tube part 27, in this embodiment, is formed as a part which is disposed in the vehicle underfloor 11 (see FIGS. 1A and 1B).

In FIGS. 2A to 5, in the continuous portion 34 of the flexible tube part 26 and straight tube part 27, there is formed a tapered portion 35 (35a, 35b). The tapered portion 35 is formed in the peripheral-direction whole portion of the continuous portion 34. The tapered portion 35 is formed as the characteristic portion of the invention. Here, reference sign 35a designates a tapered portion having a relatively steep slope, whereas reference sign 35b designates a tapered portion having a relatively gentle slope.

In FIGS. 2A to 5, the tapered portion 35 is formed as a portion used to reduce or eliminate stress concentration in the continuous portion 34 of the flexible tube part 26 and straight tube part 27. In other words, the tapered portion 35 is formed as a portion which prevents stress from being concentrated in the continuous portion 34. The tapered portion 35 is formed in such a shape that the inner peripheral surface 36 and outer peripheral surface 37 thereof both provide slopes between the top 30 of the bellows projection 29 of the flexible tube part 26 and the straight tube part 27. The slope (inclination) of the tapered portion 35 is set at a proper angle. The tapered portion 35a is suitable for a steep slope, and, the tapered portion 35b is suitable for a gentle slope.

The tapered portion 35 is formed in such a shape that the above-mentioned slopes continue with the flexible tube part 26 and straight tube part 27 through rounds 38 (R). The tapered portion 35 is also formed in such a shape that the thickness thereof is substantially uniform with respect to the flexible tube part 26 and/or straight tube part 27. Such shape is employed in order to make stress concentration difficult. Here, the curvature of the round 38 (R) may be set properly. That is, any one of small and large Rs may be used.

In FIGS. 3A to 3C and FIG. 5, for the tapered portion 35 of this embodiment, in the continuous portion 34 of the longest straight tube part 27 and flexible tube part 26 to be arranged in the vehicle underfloor 11 (see FIGS. 1A and 1B), there is arranged the tapered portion 35b having a relatively gentle slope (this is an example).

In the above structure, the wire harness 15 is manufactured in the following manner (see, for example, FIGS. 2A and 2B and FIG. 5). That is, the wire harness 15 is manufactured by inserting the conductive path 21 from one end opening of the exterior member 22, the whole of which is resin-molded in a substantially straight shape, to the other end opening thereof. Also, the wire harness 15 is manufactured by installing a clamp C, a grommet, boots and the like at given positions in the outer surface of the exterior member 22. Further, the wire harness 15 is manufactured by providing a connector 20 on the end portion of the conductive path 21.

After the wire harness 15 is manufactured in the above manner, a given flexible tube part 26 may be folded into a bent shape, thereby completing the packing of the wire harness 15. The wire harness 15 is compact and is transported in such compact state to a vehicle assembling site.

In the vehicle assembling site, the wire harness 15 is installed in the installation target 39 of the vehicle from the long-sized portion thereof which corresponds to the vehicle underfloor 11 (see FIGS. 1A and 1B). Since the longest straight tube part 27 of the exterior member 22 is arranged in the long-sized portion of the wire harness 15 corresponding to the vehicle underfloor 11, the wire harness 15 is installed in a deflection reduced state. In this case, the wire harness 15 is installed with good workability. After the long-sized portion of the wire harness 15 corresponding to the vehicle underfloor 11 is fixed by the clamp C or the like, the remaining portions of the wire harness 15 are installed while deflecting (while bending) the portion of the flexible tube part 26 of the exterior member 22. When a series of operation related to installation is completed, the wire harness 15 provides a state where it is arranged through a desired route.

As described above with reference to FIGS. 1A to 5, according to the wire harness 15 of the invention, in the continuous portion 34 of the flexible tube part 26 and straight tube part 27 of the exterior member 22, the tapered portion 35 functions effectively as a portion to reduce or eliminate stress concentration. That is, even when the exterior member 22 receives vibrations occurring, for example, during running of the vehicle, stress concentration can be reduced or eliminated when compared with the prior art where stress concentration occurs. Therefore, the wire harness 15 of the invention provides an effect that occurrence of cracks or breakage caused by stress concentration can be prevented.

Also, according to the wire harness 15 of the invention, since the round 38 (R) is formed in the tapered portion 35 and the thickness of the tapered portion 35 is formed substantially uniform, there is provided an effect that occurrence of cracks or breakage caused by stress concentration can be prevented more positively.

Figure 6A:
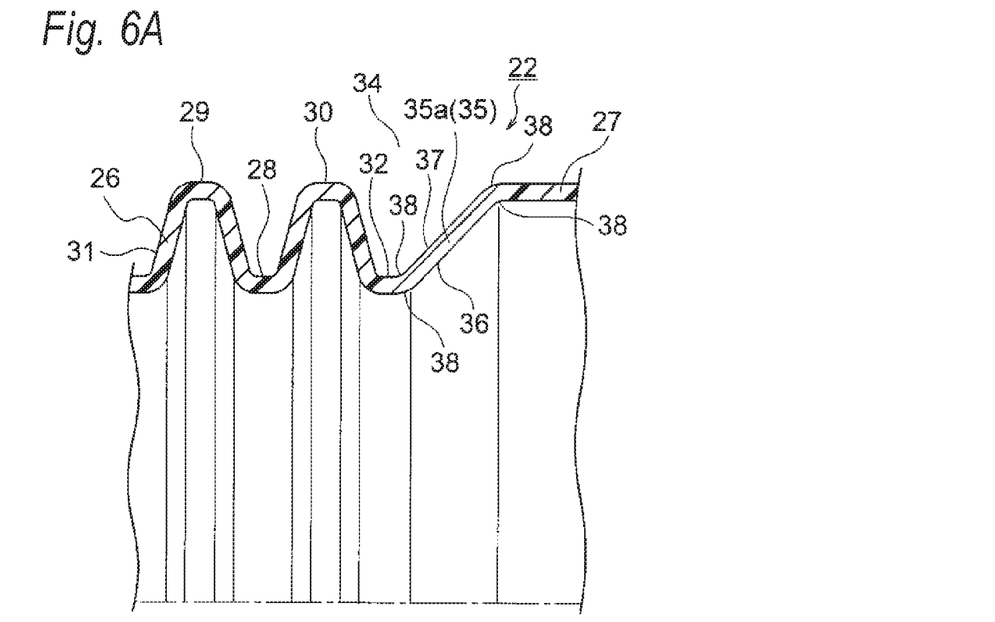
FIG. 6A is a section view of a tapered portion having a relatively steep slope of the exterior member according to a second embodiment of the invention.
Figure 6B:
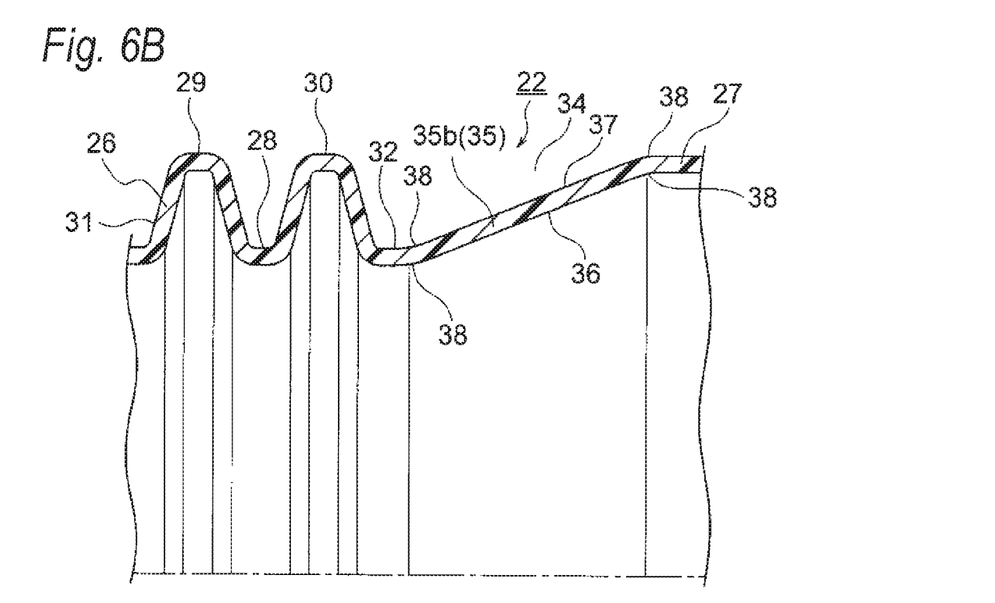
FIG. 6B is a section view of a tapered portion having a relatively gentle slope according to a second embodiment of the invention.

Description is given below of a second embodiment with reference to the drawings. FIGS. 6A and 6B are section views of an exterior member according to a second embodiment. FIG. 6A is a section view of a tapered portion having a relatively steep slope, and FIG. 6B is a section view of a tapered portion having a relatively gentle slope. Here, the composing members of the second embodiment basically the same as those of the first embodiment are given the same reference numerals and thus the detailed description thereof is omitted.

In FIGS. 6A and 6B, an exterior member 22 according to another embodiment is a resin-molded product, and includes a flexible tube part 26 and a straight tube part 27 for arranging a conductive path straight. The flexible tube part 26 and straight tube part 27 are formed in multiple numbers. Also, the flexible tube part 26 and straight tube part 27 are arranged alternately. The exterior member 22 of the second embodiment, as can be seen from FIGS. 6A and 6B, is formed in such a shape that the straight tube part 27 is slightly thicker than the first embodiment.

In FIGS. 6A and 6B, the tapered portion 35 (35a, 35b) is formed as a portion used to reduce or eliminate stress concentration in the continuous portion 34 of the flexible tube part 26 and straight tube part 27. In other words, the tapered portion 35 is formed so as to prevent stress concentration in the continuous portion 34. The tapered portion 35 is formed in such a shape that the inner peripheral surface 36 and outer peripheral surface 37 thereof both provide slopes between the groove bottom 32 of the bellows recess 28 of the flexible tube part 26 and the straight tube part 27. The slope (inclination) of the tapered portion 35 is set at a proper angle. The tapered portion 35a is suitable for a steep slope, and the tapered portion 35b is suitable for a gentle slope.

The tapered portion 35 is formed in such a shape that the above-mentioned slopes continue with the flexible tube part 26 and straight tube part 27 through rounds 38 (R). The tapered portion 35 is also formed in such a shape that the thickness thereof is substantially uniform with respect to the flexible tube part 26 and/or straight tube part 27.

As described above with reference to FIGS. 6A and 6B, when the exterior member 22 of the second embodiment is employed, there can be provided a similar effect to the first embodiment. That is, occurrence of cracks and breakage caused by stress concentration can be prevented.

In view of the above, according to an aspect of the invention, there is provided the wire harness described as (i) to (iii) below.
(i) A wire harness (15) including:
an exterior member (22) having a tube shape; and
at least one conductive path (21) configured to be inserted into the exterior member (22) so as to be protected by the exterior member (22),
wherein the exterior member (22) includes a flexible tube part (26) formed in a flexible bellows tube shape and a straight tube part (27) not having such flexibility as the flexible tube part (26) has,
the straight tube part (27) is formed continuously with the flexible tube part (26) so as to arrange the conductive path (21) straight and has a non-bellows tube shape,
a continuous portion (34) between the flexible tube part (26) and the straight tube part (27) includes a tapered portion (35) formed in a whole peripheral direction of the exterior member (22) so as to reduce stress concentration in the continuous portion (34), and
an inner peripheral surface (36) and an outer peripheral surface (37) of the tapered portion (35) include slopes connecting a top (30) of a bellows projection (29) of the flexible tube part (26) and the straight tube part (27), or connecting a groove bottom (32) of a bellows recess (28) of the flexible tube part (26) and the straight tube part (27).
(ii) The slopes continue with the flexible tube part (26) and the straight tube part (27) through a round (38).
(iii) A thickness of the tapered portion (35) is defined so as to substantially uniform with respect to at least one of the flexible tube part (26) and the straight tube part (27).

According to the invention as the (i) above, in the continuous portion of the flexible tube part and straight tube part of the exterior member, the tapered portion functions effectively as a portion for reducing the stress concentration, or as a portion for eliminating the stress concentration. That is, in the prior art, when the exterior member receives vibrations, for example, during running of the vehicle, stress concentration occurs; meanwhile, according to the invention, even in such case, the stress concentration can be reduced or eliminated.

According to the invention as the (ii) above, by applying the round when forming the tapered portion, stress can be made difficult to concentrate.

According to the invention as the (iii) above, since the thickness of the tapered portion is made uniform when forming the tapered portion, stress can be made difficult to concentrate.

According to the invention according to the (i) above, there is provided an effect that occurrence of cracks and breakage caused by stress concentration can be prevented. Also, according to the inventions according to the (ii) and (iii) above, there is provided an effect that occurrence of cracks and breakage caused by stress concentration can be prevented more positively.

Also, of course, the invention can be enforced while it is changed variously without changing the subject matter of the invention.

What is claimed is:
1. A wire harness comprising:
an exterior member having a tube shape; and
at least one conductive path configured to be inserted into the exterior member so as to be protected by the exterior member,
wherein the exterior member includes a flexible tube part formed in a flexible bellows tube shape and a straight tube part not having such flexibility as the flexible tube part has,
wherein the straight tube part is formed continuously with the flexible tube part so as to arrange the conductive path straight, has a same cross-sectional shape as the flexible tube part, and has a non-bellows tube shape,
wherein a continuous portion between the flexible tube part and the straight tube part includes a tapered portion,
wherein an inner peripheral surface and an outer peripheral surface of the tapered portion include slopes connecting a top of a bellows projection of the flexible tube part and the straight tube part, or connecting a groove bottom of a bellows recess of the flexible tube part and the straight tube part,
wherein an inclination of the tapered portion has a slope less than an inclination of the flexible tube part, wherein in the exterior member, the flexible tube part and the straight tube part are alternately arranged in a longitudinal direction of the exterior member, and wherein the tapered portion is formed on the continuous portion between the straight tube part and the flexible tube part on both sides of the straight tube part.

2. The wire harness according to claim 1, wherein the slopes continue with the flexible tube part and the straight tube part through a round.

3. The wire harness according to claim 1, wherein a thickness of the tapered portion is defined so as to be substantially uniform with respect to at least one of the flexible tube part and the straight tube part.

4. The wire harness according to claim 2, wherein a thickness of the tapered portion is defined so as to be substantially uniform with respect to at least one of the flexible tube part and the straight tube part.

5. The wire harness according to claim 1, wherein the tapered portion is formed in a whole peripheral direction of the exterior member so as to reduce stress concentration in the continuous portion.

\* \* \* \* \*